STENOGRAPHIC APPARATUS PROVIDING PUNCHED TAPE RECORD

Original Filed March 30, 1966 5 Sheets-Sheet 1

Frank L. Pellegrini,
Inventor.
Koenig, Senniger, Powers and Leavitt,
Attorneys.

STENOGRAPHIC APPARATUS PROVIDING PUNCHED TAPE RECORD

Original Filed March 30, 1966 5 Sheets-Sheet 2

15

STENOGRAPHIC APPARATUS PROVIDING PUNCHED TAPE RECORD

Original Filed March 30. 1966 5 Sheets-Sheet 4

STENOGRAPHIC APPARATUS PROVIDING PUNCHED TAPE RECORD

Original Filed March 30, 1966 5 Sheets-Sheet 5

United States Patent Office

Re. 26,981
Reissued Nov. 17, 1970

26,981
STENOGRAPHIC APPARATUS PROVIDING PUNCHED TAPE RECORD

Frank L. Pellegrini, Crestwood, Mo., assignor to Stenomation Incorporated, St. Louis, Mo., a corporation of Missouri Original No. 3,372,865, dated Mar. 12, 1968, Ser. No. 538,644, Mar. 30, 1966. Application for reissue June 25, 1969, Ser. No. 862,981
Int. Cl. G06k *1/22*
U.S. Cl. 234—1 19 Claims

Matter enclosed in heavy brackets [ ] appears in the original patent but forms no part of this reissue specification; matter printed in italics indicates the additions made by reissue.

ABSTRACT OF THE DISCLOSURE

The stenographic apparatus disclosed herein employs a plurality of punches which are independently operable on respective drive means to punch distinctive patterns of holes in a paper tape. Each of the punches is controlled by a respective key of a stenographic machine. Thus, when a preselected combination of keys are operated, the corresponding punches are operated to punch their respective patterns in a predetermined section of the tape. The apparatus also includes means for advancing the tape to place a new, unpunched section of tape in position to be operated on by the punches when previously operated keys are released. In this way, the apparatus provides a punched record which is readable for digital computing equipment for automatically preparing a printed transcription of the record.

This invention relates to stenographic apparatus, and more particularly to such apparatus providing a punch-tape record which is readable by digital computing equipment for automatically preparing a printed transcription of the subject matter being recorded.

In the preparation of official records of court proceedings and the like, the initial record is taken down manually either in shorthand or with the use of a stenographic machine. While stenographic machines have an advantage over the use of shorthand in that they facilitate the preparation of a transcription by other than the original machine operator, both methods as now practiced do require that the initial record be transcribed by a human agent.

Among the several objects of the present invention may be noted the provision of stenographic apparatus which will provide a punch-tape record readable by digital computing equipment for automatically preparing a printed transcription of the subject matter being recorded; the provision of such apparatus which is usable with a stenographic machine of the type having a plurality of keys which are manually operated in predetermined combinations to make a printed record suitable for later transcription; the provision of such apparatus in which the operation of each of the keys produces a predetermined pattern of perforations in the tape according to a preselected code, each pattern being distinct from the patterns made by any of the other punches; the provision of such apparatus by means of which a record corresponding to the operation of a plurality of said keys in predetermined combination may be prepared simultaneously with that operation; the provision of such apparatus which will operate rapidly; the provision of such apparatus which is portable, relatively simple and inexpensive; and the provision of such apparatus which is reliable. Other objects will be in part apparent and in part pointed out hereinafter.

Briefly, apparatus according to the present invention is usable with a stenographic machine of the type having a plurality of keys which are manually operated in predetermined combinations to make a printed record suitable for later transcription. The apparatus includes a plurality of punches which are arranged to operate independently on a section of record material aligned by suitable guide means. Each of the punches is operative when actuated to punch a predetermined pattern of perforations in the record material, which pattern is distinct from the patterns made by any of the other punches. The patterns represent respective ones of the keys according to a preselected code. A respective separate drive means is provided for each of the punches and is operative when tripped for actuating the respective punch. The apparatus includes also means responsive to the operation of each of the stenographic machine keys for tripping a respective drive means and means responsive to the release of previously operated keys for advancing the record material to place a new, unpunched section of tape in position to be operated on by the punches. Accordingly, operation of the stenographic machine produces a coded punch-tape suitable for automatic transcription of the subject matter being recorded.

The invention accordingly comprises the constructions hereinafter described, the scope of the invention being indicated in the following claims.

In the accompanying drawings in which one of various possible embodiments of the invention are illustrated, FIG. 1 is a flow chart representing the transformation of information in the automatic preparation of a transcription using apparatus according to the present invention;

Corresponding reference characters indicate corresponding parts throughout the several views of the drawings.

Figure 1:
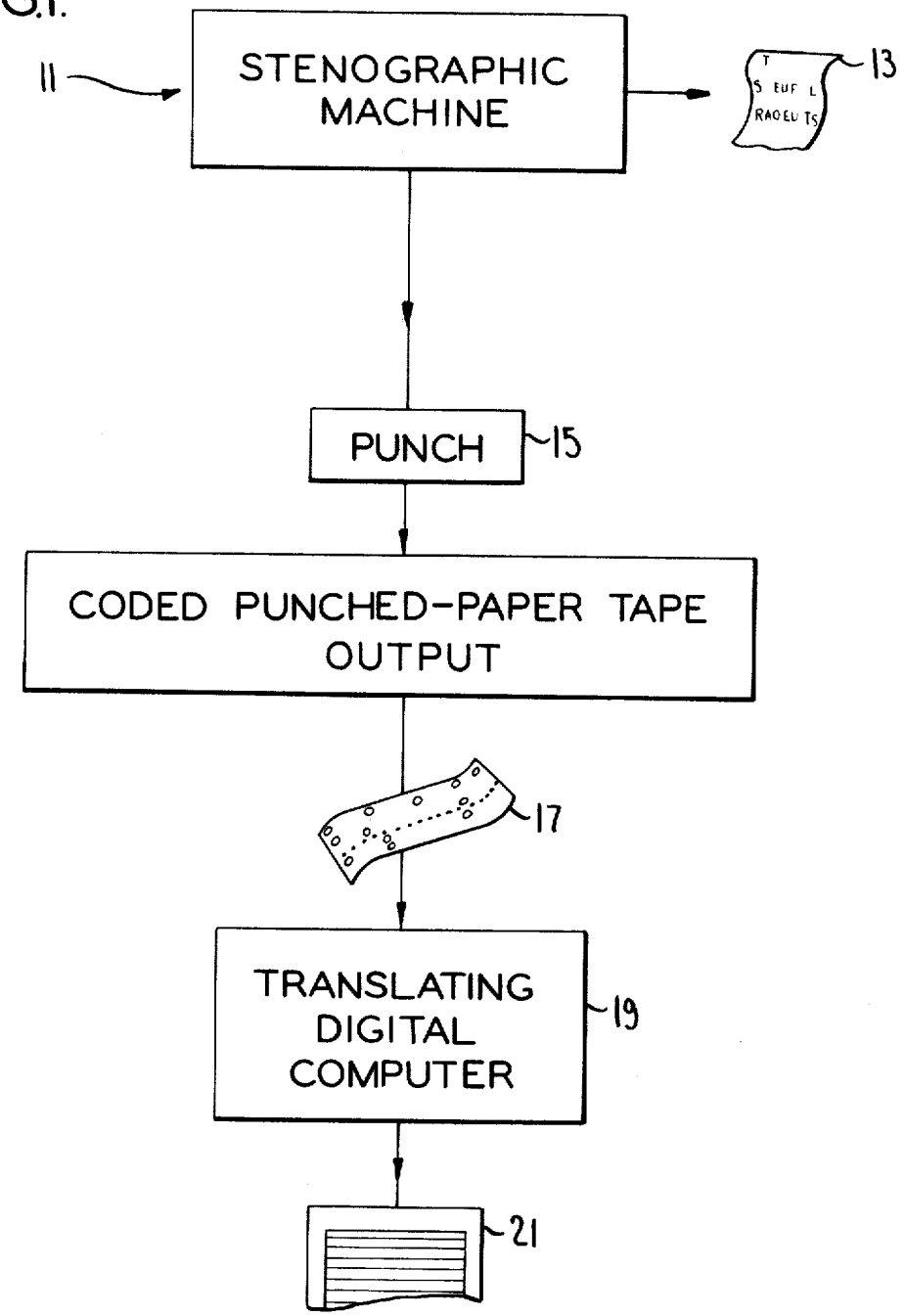

Referring now to FIG. 1 there is indicated at 11 an essentially conventional stenographic machine of the type having a plurality of keys which may be manually operated in predetermined combinations to produce a printed record suitable for later transcription by the operator or some other person knowing the code format used in operating the machine. The printed record as indicated at 13 typically comprises a paper tape. Each separate operation of the stenographic machine prints a line or horizontal row of characters on the tape, there being one character in the line for each key used in the operation, the characters being distinct from each other. When the keys are released, the tape 13 is advanced so that the next operation of a group of keys prints its characters in a new line on the tape. Certain of the stenographic machine keys may also be caused to print a second character, also distinct from all the other characters, by the operation of a shift key which shifts the type faces with respect to the printing platen.

At 15 is indicated a paper tape punching apparatus according to the present invention which is electrically coupled to the stenographic machine 11 to be controlled thereby. When the stenographic machine 11 is operated, punch 15 produces a punched paper tape record as indicated at 17. One section of the punch-tape represents each line of the printed record, the different printed characters being represented by respective, distinctive patterns of perforations within the section. Each section of tape includes a position for a row of perforations for each of the possible characters. The pattern of perforations produced in that row when the respective key is operated is preferably a conventional digital representation of that character in a preselected conventional code as typically used in digital computing equipment.

The punched tape record 17 is fed into a translating digital computer or compiler 19 having a memory in which are stored the English words corresponding to the predetermined combinations of keys which the original operator employs to designate those words. Each such English word is stored in the memory at an address, the designation of which is the digitally coded equivalent of the letters which represent that word in the stenographic language being used. Since the punched tape record is already in digital encoded form, the translating computer 19 thus merely performs a relatively straight-forward retrieval program to obtain the English word equivalent of the punch-tape record. Having obtained the English word equivalent, the completed transcription may either be printed out directly as indicated at 21 or stored on paper or magnetic tape for later printing. This latter procedure is preferable in that it saves computer time, computer operation typically being many times faster than the operation of available printers.

Figures 2, 3:
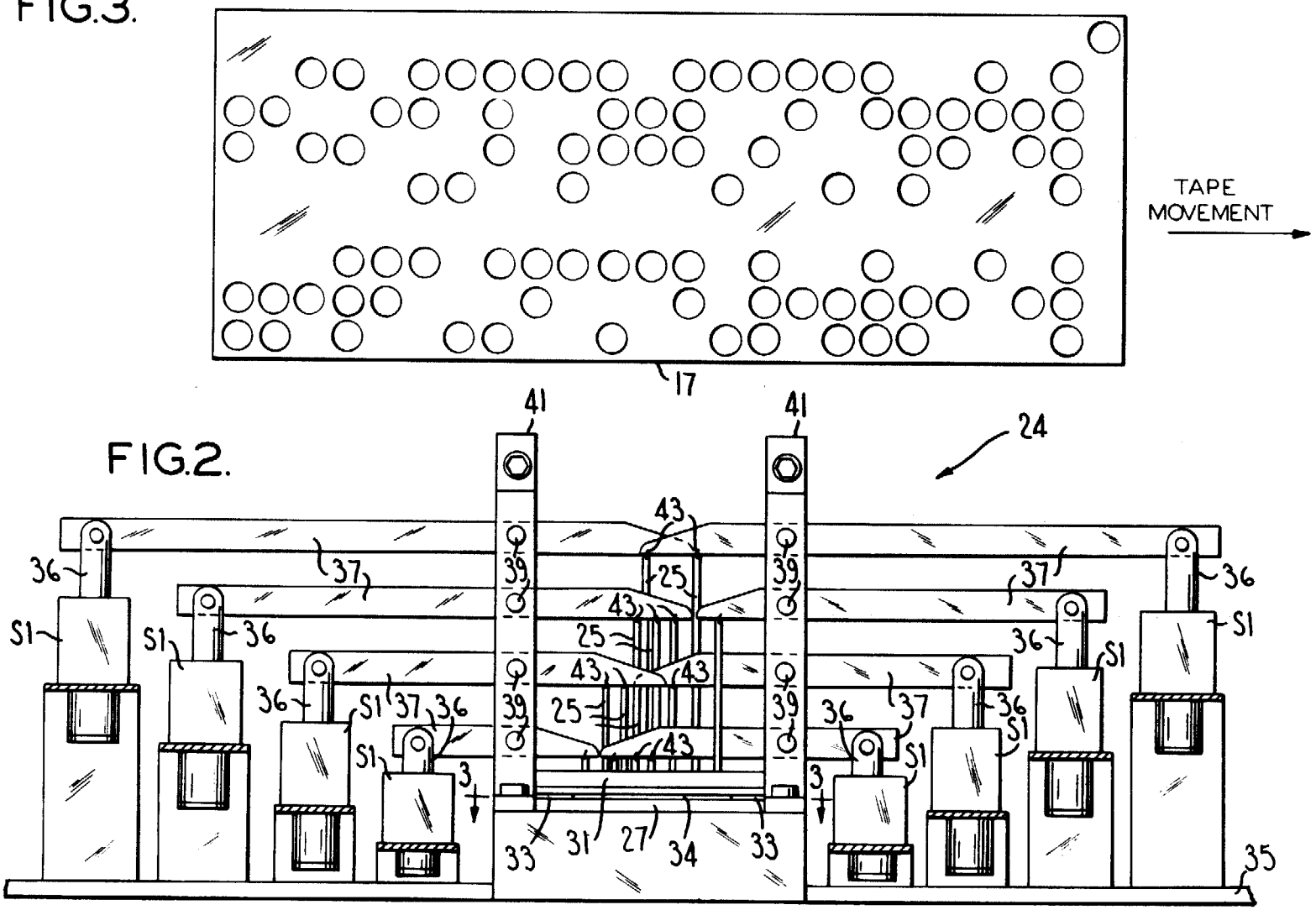
FIG. 2 is an end view of apparatus for punching paper tape in predetermined patterns.
FIG. 3 is a section on the line 3—3 of FIG. 2 showing the arrangement of punch pins therein.

Having thus explained the general mode of operation of this apparatus, the function of the specific construction shown in FIGS. 2–5 may readily be understood. In FIG. 2 there is shown at 24 punching apparatus which includes a plurality of independently operable punches. The actual perforating of the paper tape is performed by a multiplicity of punch pins 25 cooperating with a die 27 having a corresponding multiplicity of openings suitably positioned therein (see FIG. 3). A row of such holes in an appropriate pattern is provided for each of the keys of the stenographic machine and sufficient holes are provided in each of the rows so that the digital code representation of each of the letters printed by the stenographic machine may be punched into a single section of paper tape. The perforations representing a single printed character on the printed tape 13 all lie in a row extending across die 27. The row is also transverse to the length of the paper tape being punched as will be apparent hereinafter. The pins 25 are maintained in alignment with the holes in die 27 by a guide block 31 having a similar multiplicity of holes therein. Guide block 31 and die 27 are separated by suitable shims or spacers 33 which define a passage 34 for paper tape between the guide 31 and the die 27.

The punch pins 25 are driven, in predetermined combinations, through guide block 31 and into die 27 by a plurality of solenoids S1 which are mounted on a common base 35 with die 27. Solenoids S1 are of the push type and include plungers 36 which are coupled to the respective sets of punch pins 25 by means of respective levers 37. The levers 37 are pivoted on shafts 39 which are in turn journaled in frames 41 mounted on base 35. The pins 25 are driven by direct contact with the respective levers 35 and are loosely coupled to the levers by links 43 for retraction.

For each group of punch pins 25 representing one of the letters printed by stenographic machine 11, there is at least one solenoid S1 so that each such group of punch pins may be operated independently of the other groups. In certain cases it may be necessary that the pins representing a given character be operated by more than one solenoid since the typographic machine 11 may print a second character in any one column if the shift control is used. The use of more than one solenoid to effect punching of a given pattern of perforations in the paper tape does not, however, effect the ability to punch each such pattern independently of the other patterns which may be punched in a given section of tape. For ease in description, the group of components employed to punch a given pattern of perforations representing one of the keys of the stenographic machine is hereinafter and in the claims referred to as a single punch even though two or more separate such mechanisms are in fact illustrated and employed since such several mechanisms may be operated together to function as a single unit when suitably controlled.

Figure 4:
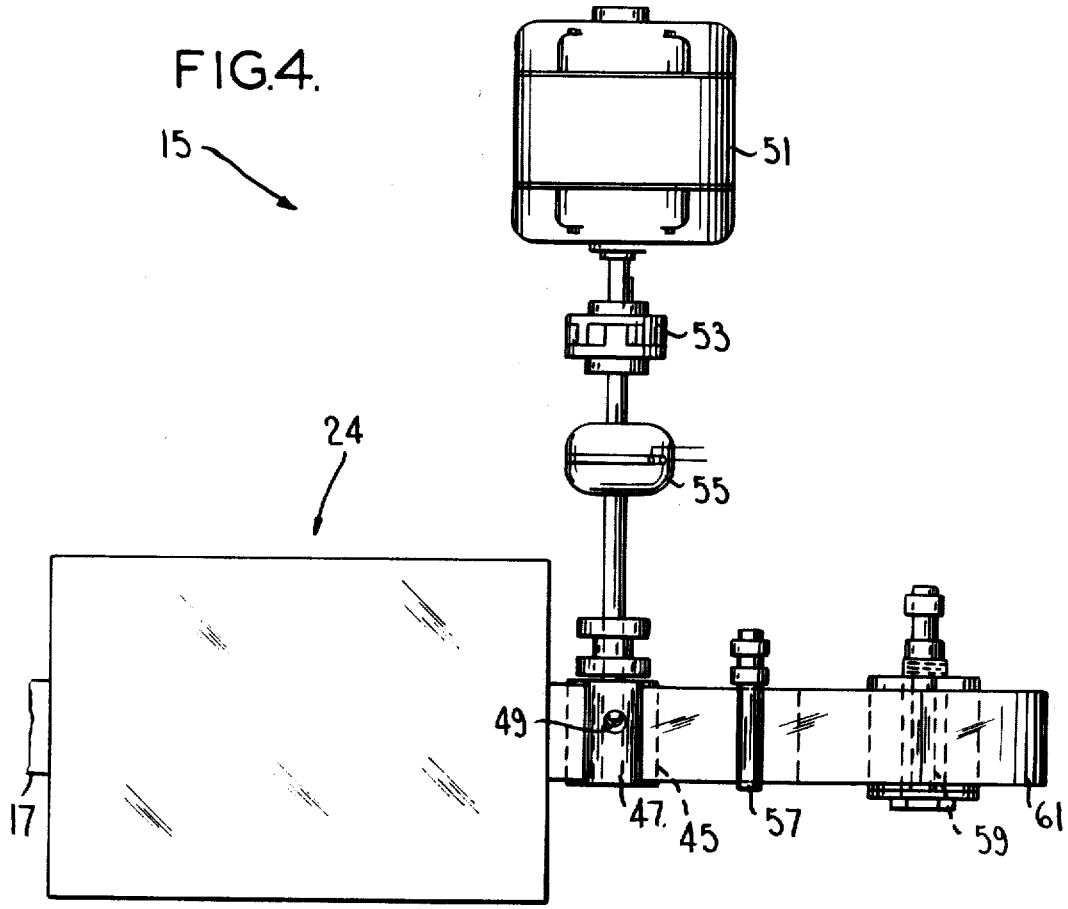
FIGS. 4 and 5 are top and side views, respectively, of apparatus for feeding paper tape through the punch of FIG. 2.
Figure 5:
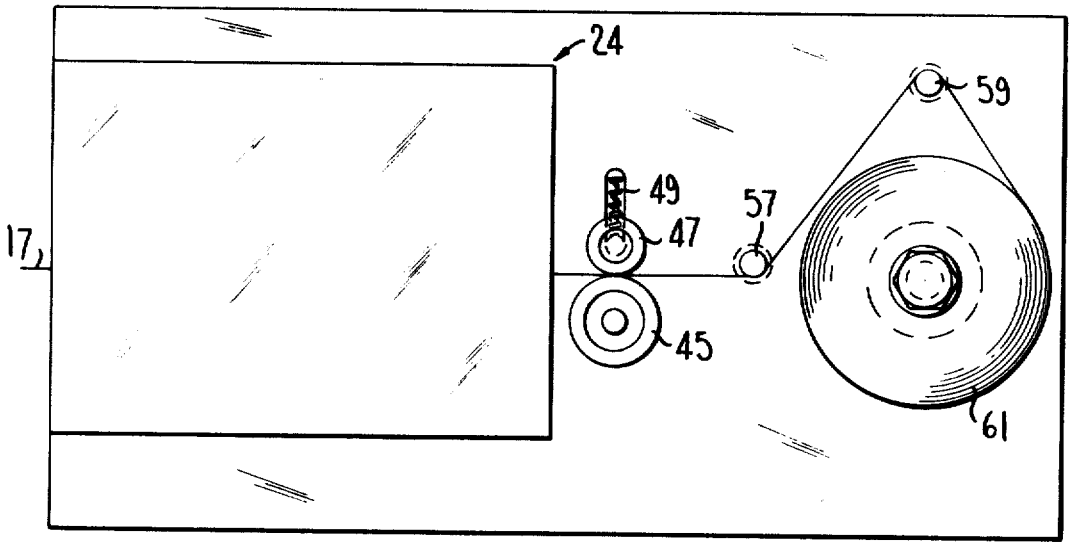

Referring now to FIGS. 3 and 4, the paper tape is drawn through the punch by a capstan 45 which is driven intermittently, as described hereinafter, to advance the tape section by section. The tape is held in engagement with capstan 45 by a pressure roller 47 which is urged against the capstan 45 by springs 49. The motive force for capstan 45 is provided by a fractional horsepower electric motor 51 which is allowed to run continuously during operation of the apparatus. The shaft of motor 51 is coupled to capstan 45 through a flexible coupling 53 and a clutch and brake coupling 55. Coupling 55 is electromagnetically actuated and is of the conventional friction type which couples the output shaft to the input shaft when the coupling is energized and brakes the output shaft when the coupling is deenergized. Such couplings are fast-acting and can both start and stop capstan 45 within a few degrees of rotation of the shaft of motor 51.

After being pulled through the punch, the paper tape passes over idler rollers 57 and 59 and is wound-up on a pickup reel 61 which is rotated by appropriate means (not shown).

Figure 6:
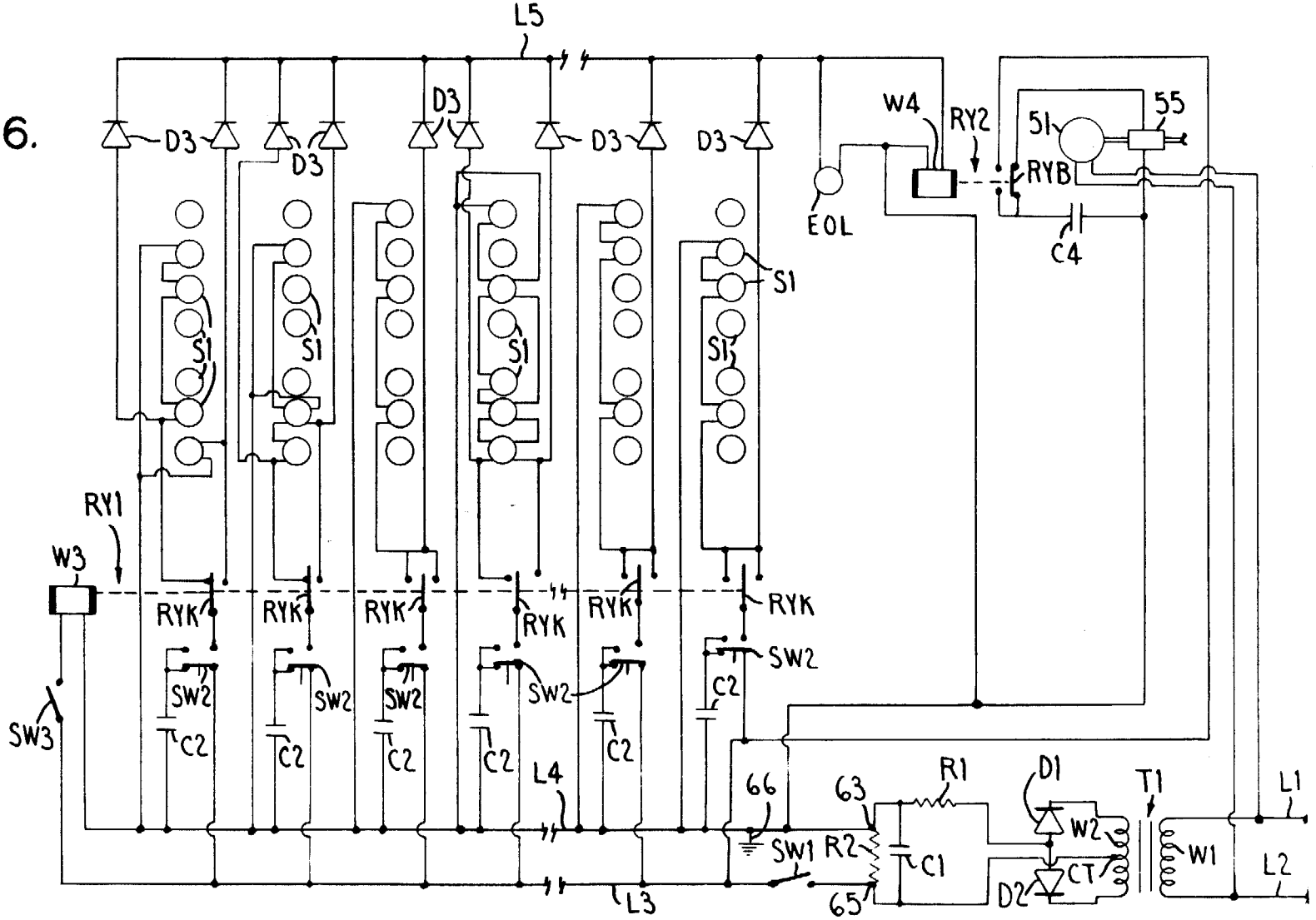
FIG. 6 is a schematic diagram of a control circuit for the punch and feed apparatus of FIGS. 2–5.

Referring now to FIG. 6, electric power for energizing this apparatus is obtained from a suitable source or supply mains through a pair of leads L1 and L2. Motor 51 is connected directly across leads L1 and L2 as is the primary winding W1 of a transformer T1. Transformer T1 includes a secondary winding W2 having a center-tap CT. The out-of-phase A.C. provided at the opposite ends of winding W2 is full-wave rectified by a pair of diodes D1 and D2 and is filtered by resistor R1 and a capacitor C1 in conventional manner to provide a source of D.C. across a pair of terminals 63 and 65. Capacitor C1 is shunted by a conventional bleed resistor R2. Positive current is supplied to the apparatus through a supply lead L3 which is connected to the terminal 65 through an on-off switch SW1. A supply lead L4 is connected directly to the negative terminal 63 and is grounded as indicated at 66.

In FIG. 6 there is indicated a solenoid S1 for each punch pin position although it will be understood that, as illustrated in FIG. 2, several of the punch pins may in fact be operated by a single solenoid depending upon the particular mechanical arrangement used. The solenoids which are energized together to provide a single given pattern are indicated as being wired in series although, as will be understood by those skilled in the art, parallel wiring may also be used by suitably adjusting the electrical parameters of the circuit. Certain of the punch pin positions are utilized for both of the two possible printed characters which may be printed by each key. Such dual operation may be accomplished by providing a dual winding on the respective solenoid, as indicated in FIG. 6 by leads extending to both sides of certain of the solenoids, or by suitable electronic gating (not shown).

Energy for operating the solenoids S1 is stored in suitable capacitors C2, there being one capacitor C2 for each row of punch pins. The capacitors are charged from D.C. supply lines L3 and L4 through the normally closed contacts of respective D.P.D.T. switches SW2. Switches SW2 are mounted on the stenographic machine 11 and are operated in response to the operation of respective ones of the machine keys. When each switch is operated, the respective capacitor C2 is discharged into selected ones of the solenoids S1 as described hereinafter.

The operating winding W3 of a multicontact relay RY1 is connected across D.C. supply lines L3 and L4 by means of a circuit which includes a normally open switch SW3. Switch SW3 is also mounted in the stenographic machine and is operated in response to the operation of the shift lever which causes certain of the keys to print a different character. Relay RY includes a plurality of contacts RYK which are wired with solenoids S1 to effect a shift between two possible sets of interconnections of the solenoids with the capacitor controlling switches SW2. The two possible sets of interconnections correspond to the two different sets of characters which can be printed by the operation of the stenographic machine keys by operating the shift lever. Since certain of the machine keys print the same character in both shift positions, the corresponding relay contacts for these keys are jumpered together.

In addition to the respective groups of solenoids, the relay output contacts are also connected to a common signal line L5 through respective isolating diodes D3. Line L5 is connected to the winding W4 of a relay RY2 and also to a single hole punch solenoid EOL, which is employed to mark the end of a line or tape section. The diodes D3 are electrically oriented so that winding W4 and solenoid EOL are energized when any of the solenoids S1 are energized by operation of the respective switches SW2. The diodes D3 prevent current from flowing to those of solenoids S1 which are not energized by operation of the respective switches SW2.

Relay RY2 includes D.P.D.T. contacts RYB. The normally closed contacts are wired to connect an energy storage capacitor C4 across electromagnetic clutch 55. The normally open contacts are wired for connecting capacitor C4 across the supply lines L3 and L4 to be charged. The value of capacitor C4 is chosen so that the energy stored therein will actuate clutch 55 for a predetermined interval sufficient to advance the paper tape through the punch to place a new, unpunched section in position to be operated on by the punches.

The operation of this apparatus is as follows. When power is applied to the cnotrol circuit, the capacitors C2 become charged. When a combination of the keys of the stenographic machine 11 are operated in conventional manner, the capacitors C2 corresponding to the operated keys are discharged through the respective solenoids S1 to actuate the respective punches. The punches are independently operable and thus may be actuated simultaneously. The punch pins pierce the paper tape 17 in patterns which represent the characters of the respective key being then operated. Thus the operation of a group of keys in combination simultaneously produces a section of punched tape containing the digitally encoded representation of all the characters then being printed on the printed tape 13.

When any of the stenographic machine keys are operated, the solenoid EOL is energized simultaneously with those selected solenoids S1 which produced the encoded record. Solenoid EOL operates a single punch pin positioned to one side of the main body of punches for the purpose of marking the location of each block or section of punch tape information.

Also simultaneously with the operation of any group of machine keys, the relays RY2 is energized. While relay RY2 is energized, capacitor C4 is charged from supply lines L3 and L4. When relay RY2 becomes deenergized, capacitor C4 is discharged through the electromagnetically operated clutch 55 thereby advancing the punched tape by a preselected distance. It can thus be seen that successive operations of the stenographic machine keys in predetermined combinations will produce successive sections of a punched tape record in which each section includes the digitally encoded representation of each character used in the respective line of the printed record. This punched tape can then be decoded by conventional digital computing equipment to prepare a printed transcription of the subject matter being recorded.

Figure 7:
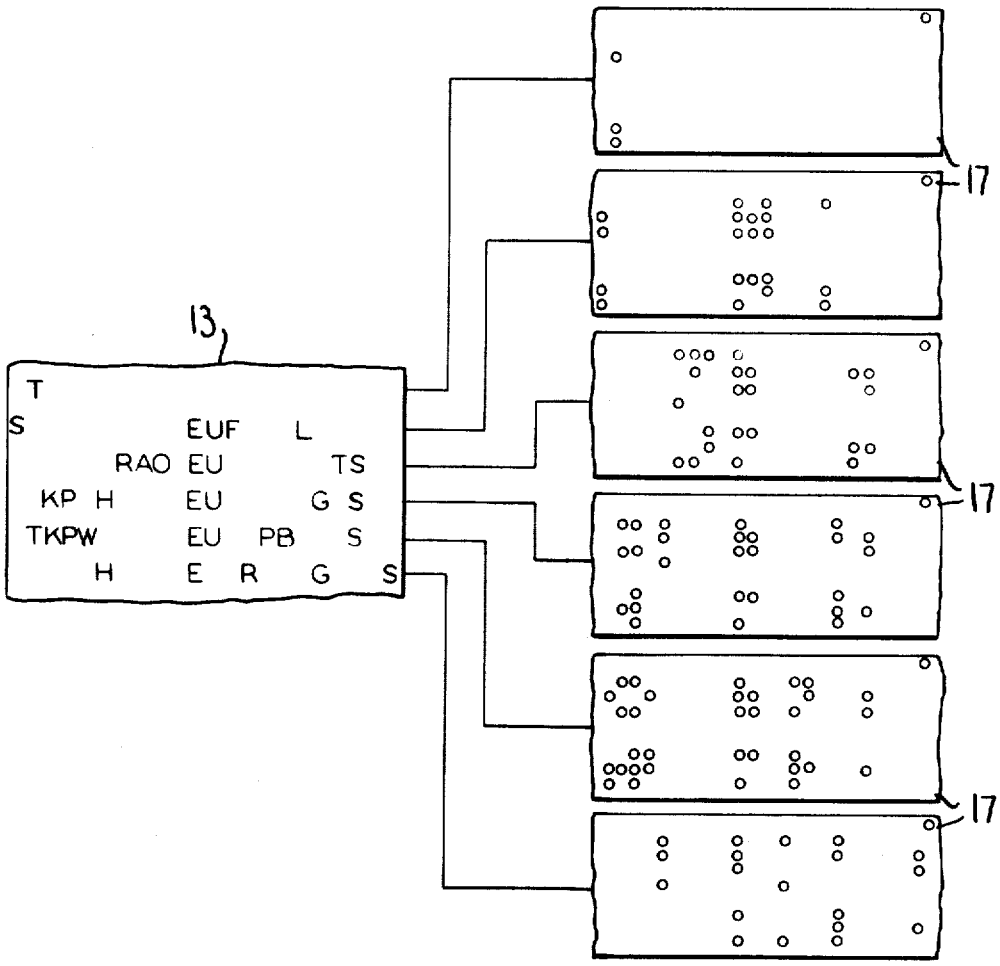
FIG. 7 is a diagram illustrating the patterns of perforations produced in successive portions of a tape to represent various portions of the record in relation to respective lines of the corresponding printed record made by a typical stenographic machine.

FIG. 7 illustrates the relationship between the printed tape record produced by the stenographic machine 11 and the punch-tape record produced by the punching apparatus 15. As noted previously, one full section of the punch-tape is produced for each row or line of the printed tape record. The successive sections of the punch-tape are illustrated one on top of the other to more clearly show the relationship between the two record forms but it will be understood that, in fact, the successive sections are produced end-to-end so as to constitute the length of the tape. Each section of tape includes in its upper right hand corner a single perforation produced by the solenoid EOL, which single perforation is above the level of the rows representing the record characters. This single perforation indicates the edge of a section of tape containing the information representing a single line of the printed tape record and does not represent a part of the record information and is not considered in the following explanation of the remaining perforation patterns.

The first printed line includes only the character T and thus the first section of the punch-tape is thus perforated in one vertical row only, the row corresponding in position ot the lateral position of the character T within the printed tape record. The pattern of perforations produced in the punch-tape row represents the character T according to the alphanumeric code conventionally employed for computer usage.

In the second printed line five characters appear and, in the section of punch-tape corresponding to this line five vertical rows are punched, the pattern in each row being distinctive and representing the respective character in the alphanumeric code mentioned previously. The successive lines and sections of punch-tape correspond similarly. It may for example be noted that, just as the letter E appears in four successive lines in the printed tape record, the respective encoded punch-tape pattern appears in the respective rows of the successive punch-tape sections.

Since the patterns are distinctive, the punch-tape may be read by conventional digital computing equipment without further translation so that a table retrieval propram may be accomplished quite quickly and the printed record can be prepared as described previously with reference to FIG. 1.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. For use with a stenographic machine of the type having a plurality of keys which are manually operated in predetermined combinations to make a printed record suitable for later transcription, apparatus for providing a digitally encoded punched record corresponding to the printed record, which punched record is readable by digital computing equipment for automatically preparing a printed transcription of the record according to the correlation of said predetermined combination with the subject matter being recorded, said apparatus comprising:

guide means for record material;

a plurality of punches arranged to operate independently on a section of record material aligned by said guide means, each of said punches being operative when actuated to punch a predetermined pattern of perforations in the tape record material, which pattern is distinct from the pattern made by any of the other punches, each pattern representing a respective one of said keys according to a preselected code;

a separate drive means operative when tripped for actuating each of said punches;

a respective means responsive to the operation of each one of said keys for tripping a respective drive means; and means responsive to release of previously operated keys for advancing said record material to place a new, unpunched section of record material in position to be operated on by said punches whereby a section of record material is punched for each operation of said keys in said predetermined combinations thereby providing a punched record suitable for automatic transcription of the subject matter being recorded.

2. For use with a stenographic machine of the type having a plurality of keys which are manually operated in predetermined combinations to make a printed record suitable for later transcription, apparatus for providing a digitally encoded punch-tape record corresponding to the printed record, which punch-tape record is readable by digital computing equipment for automatically preparing a printed transcription of the record according to the correlation of said predetermined combinations with the subject matter being recorded, said apparatus comprising;

tape guide means;

a plurality of punches arranged to operate independently on a section of tape aligned by said guide means, each of said punches being operative when actuated to punch a predetermined pattern of perforations in the tape, which pattern is distinct from the patterns made by any of the other punches, each pattern representing a respective one of said keys according to a preselected code;

a separate drive means operative when tripped for actuating each of said punnches;

a respective means responsive to the operation of each one of said keys for tripping a respective drive means; and means responsive to release of previously operated keys for advancing said tape to place a new, unpunched section of tape in position to be operated on by said punches whereby a section of tape is punched for each operation of said keys in said predetermined combinations thereby providing a punch-tape suitable for automatic transcription of the subject matter being recorded.

3. Apparatus as set forth in claim 2 wherein the perforations produced by each punch lie in a respective line extending transverse to the length of said tape.

4. Apparatus as set forth in claim 2 wherein certain of said punches selectively produce a second respective pattern of perforations in response to a shift in the printed characters produced by the operation of the respective keys.

5. Apparatus as set forth in claim 2 wherein certain of said punches comprise respective pluralities of punch pins, said pins being slidably supported in a common guide block in predetermined relation to said tape guide means.

6. Apparatus as set forth in claim 5 wherein each of said drive means includes a solenoid for actuating respective pluralities of said punch pins to produce said patterns.

7. Apparatus as set forth in claim 6 including an energy storage capacitor for each of said solenoids, said means for tripping said drive means including switch means for charging said capacitors between operations of said keys and for discharging each capacitor through the respective solenoid when the respective key is operated.

8. Apparatus as set forth in claim 2 wherein the means for advancing said tape includes a motor which runs continuously during the operation of said apparatus and a magnetic clutch which is energized for a predetermined interval in response to the release of previously operated keys to advance said tape a predetermined distance.

9. Apparatus as set forth in claim 8 wherein the means for advancing said tape includes an energy storage capacitor which is charged during the operation of any of said keys and is discharged to energize said magnetic clutch for said predetermined interval in response to the release of previously operated keys.

10. For use with a stenographic machine of the type having a plurality of keys which are manually operated in predetermined combination to make a printed record suitable for later transcription, apparatus for providing a digitally encoded punch-tape record corresponding to the printed record, which punch-tape record is readable by digital computing equipment for automatically preparing a printed transcription of the record according to the correlation of said predetermined combinations with the subject matter being recorded, said apparatus comprising:

tape guide means;

a plurality of punches arranged to operate independently on a section of tape aligned by said guide means each of said punches being operative when actuated to punch a predetermined pattern of perforations in the tape, which pattern is distinct from the patterns made by any of the other punches, each pattern representing a respective one of said keys according to a preselected code;

a separate solenoid operative when energized for actuating each of said punches;

an energy storage capacitor for each of said solenoids;

switch means responsive to the operation of each one of said keys for charging said capacitors between operations of said keys and for discharging each capacitor through the respective solenoid when the respective key is operated;

a motor which runs continuously during operation of said apparatus;

means for advancing said tape;

magnetic clutch means which when energized couple said motor to said means for advancing said tape; and means responsive to release of previously operated keys energizing said clutch for a predetermined interval to advance said tape to place a new, unpunched section of tape in position to be operated on by said punches whereby a section of tape is punched for each operation of said keys in said predetermined combinations thereby providing a punch-type suitable for automatic transcription of the subject matter being recorded.

*11. For use with a stenographic machine of the type having a plurality of keys which are manually operated in predetermined combinations to make a printed record suitable for later transcription, apparatus for providing a digitally encoded record corresponding to the printed record, which digitally encoded record is readable by digital computing equipment for automatically preparing a printed transcription of the record according to the correlation of said predetermined combinations with the subject matter being recorded, said apparatus comprising:*

*(a) guide means for record material;*

*(b) a plurality of recording members arranged to operate independently on a section of record material aligned by said guide means, each of said recording members being operative when actuated to record an element of a digital code on the tape record material, which element is distinct from the elements recorded by any of the other recording elements, each of said elements representing a respective one of said keys according to a preselected code;*

*(c) a drive means operative when actuated, for actuating said recording members; and*

(d) *means responsive the release of the previously operated recording members for advancing said record material to place a new unrecorded section of record material in position for recording whereby a section of record material is recorded for each operation of said keys in said predetermined combinations thereby providing a digitally encoded record suitable for automatic transcription of the subject matter.*

*12. An apparatus for producing a digitally encoded record in a first code on a record material coresponding to the printed record in a second code of a stenographic machine having a plurality of manually operable keys; said apparatus comprising:*

(a) *means for operatively interfacing said apparatus to said stenographic machine;*

(b) *a recording member operable by actuation of any of said keys to record elements of said first code on said record material and where the elements correspond to elements of said second code produced by operation of said keys;*

(c) *means responsive to operation of said keys to actuate said recording member;*

(d) *means responsive to release of said keys to advance said record material to an unrecorded section thereof to a position for recording thereon;*

*whereby a section of said record material is recorded in said first code in response to operation of said keys to produce a digitally encoded record suitable for automatic transcription.*

*13. The apparatus of claim 12 further characterized in that said recording member is a plurality of punches which are operated on said record material to produce a predetermined pattern of perforations in said record material, which pattern of perforations form part of said first code.*

*14. The apparatus of claim 13 further characterized in that the pattern of perforations produced by actuation of one key is distinct from the pattern of perforations made by actuation of any other key.*

*15. The apparatus of claim 12 further characterized in that the record is readable by digital computing equipment for automatically preparing a printed transcription of said record.*

*16. The method of providing a digitally encoded record corresponding to the printed record made from a stenographic machine having a plurality of manually operable keys and where the digitally encoded record is readable by digital computing equipment, said method comprising:*

(a) *operating a plurality of keys on a stenographic machine to produce a stenographic record in a first code corresponding to elements of an intelligible language, and where each such key represents an intelligible member of said first code which is distinct from an intelligible member represented by any other key;*

(b) *operating a plurality of recording elements in response to actuation of the keys on said stenographic machine to produce a digitally encoded record in a second code corresponding to said first code and to the elements of said intelligible language, and where each such recording element represents at least one intelligible member of said second code which is distinct from an intelligible member represented by any other recording member;*

(c) *advancing said stenographic record and digitally encoded record in temporal relationship to place unrecorded sections thereof in position to be recorded; and*

(d) *automatically transcribing said digitally encoded record.*

*17. The method of providing a digitally encoded record corresponding to the printed record made from a stenographic machine having a plurality of keys thereon; said method comprising:*

(a) *operating the keys on said machine to produce a stenographic record from elements of a first code corresponding to elements of an intelligible language, and where each key produces an element of said first code which is distinct from the element of the first code produced by any other key;*

(b) *operating a recording element in response to actuation of the keys on said stenographic machine to produce elements of a second code to produce a digitally encoded record on a digitally encoded member corresponding to elements of said first code and to elements of said intelligible language;*

(c) *advancing said stenographic record and digitally encoded record in temporal relationship to place unrecorded sections of said records in position for recording; and*

(d) *automatically transcribing said digitally encoded record.*

*18. The method of claim 17 further characterized in that the method of producing the elements of the second code on said digitally encoded record member is by perforating said digitally encoded record member.*

*19. The method of claim 18 further characterized in that the pattern of perforation produced in response to actuation of any one key differs from the pattern of perforations produced by actuation of any other key.*

References Cited

The following references, cited by the Examiner, are of record in the patented file of this patent or the original patent.

UNITED STATES PATENTS

| | | | |
|---|---|---|---|
| 2,912,090 | 11/1959 | Holmes | 197—9 X |
| 2,085,120 | 6/1937 | Potts | 234—124 X |

FOREIGN PATENTS

| | | |
|---|---|---|
| 305,433 | 5/1955 | France. |
| 517,530 | 2/1953 | Belgium. |

WILLIAM S. LAWSON, Primary Examiner

U.S. Cl. X.R.

83—620; 197—1.6, 9; 234—36, 43, 108, 123, 128

UNITED STATES PATENT OFFICE

CERTIFICATE OF CORRECTION

Patent No. Reissue No.26,981 Dated November 17, 1970

Inventor(s) Frank L. Pellegrini

It is certified that error appears in the above-identified patent and that said Letters Patent are hereby corrected as shown below:

In the heading to the printed specification, lines 4 to 6, "assignor to Stenomation Incorporated, St. Louis, Mo., a corporation of Missouri" should read -- assignor, by mesne assignments, to Diginetics Incorporated, a corporation of Missouri --.

Signed and sealed this 16th day of March 1971.

(SEAL)
Attest:

EDWARD M.FLETCHER,JR.
Attesting Officer

WILLIAM E. SCHUYLER, JR.
Commissioner of Patents

USCOMM-DC 60376-P69
☆ U.S. GOVERNMENT PRINTING OFFICE : 1969 O—366-334